(12) United States Patent
Wellershoff (10) Patent No.: US 9,347,606 B2
(45) Date of Patent: May 24, 2016

(54) HOLDING DEVICE FOR FLAT ELEMENTS (75) Inventor: Frank Wellershoff, Hamburg (DE)

(73) Assignee: JOSEF GARTNER GMBH, Gundelfingen (DE)

( * ) Notice: Subject to any disclaimer, the term of this patent is extended or adjusted under 35 U.S.C. 154(b) by 152 days.

(21) Appl. No.: 13/976,146

(22) PCT Filed: Dec. 30, 2011

(86) PCT No.: PCT/DE2011/002191
§ 371 (c)(1),
(2), (4) Date: Jun. 26, 2013

(87) PCT Pub. No.: WO2012/097779
PCT Pub. Date: Jul. 26, 2012

(65) Prior Publication Data
US 2013/0284878 A1 Oct. 31, 2013

(30) Foreign Application Priority Data
Dec. 30, 2010 (DE) .......................... 10 2010 056 502

(51) Int. Cl.
*A47B 96/06* (2006.01)
*E04G 3/00* (2006.01)
(Continued)

(52) U.S. Cl.
CPC .............. *F16M 13/02* (2013.01); *E06B 3/5445* (2013.01)

(58) Field of Classification Search
CPC ............................. F16M 13/02; E06B 3/5445
USPC ............ 248/544, 689, 68.1, 72, 74.1, 229.12,
248/229.14, 229.22, 229.24, 228.3, 228.5,
248/230.3, 230.5, 231.41, 231.61, 231.85,
248/570, 565, 580, 634, 635, 229.1, 560,
248/562, 636, 548; 269/55; 254/418–425
See application file for complete search history.

(56) References Cited

U.S. PATENT DOCUMENTS 1,315,509 A * 9/1919 Joyce ..................... B25B 5/102
248/229.14
2,345,708 A * 4/1944 Lines ............................. 269/73
(Continued)

FOREIGN PATENT DOCUMENTS

DE 195 19 527 A1 11/1996
DE 197 13 678 A1 10/1998
(Continued)

OTHER PUBLICATIONS

English Translation of the International Preliminary Report on Patentability, PCT/DE2011/002191, Jul. 11, 2013, 8 pages.
(Continued)

*Primary Examiner* — Terrell McKinnon
*Assistant Examiner* — Michael McDuffie
(74) *Attorney, Agent, or Firm* — Quarles & Brady LLP (57) ABSTRACT

The invention relates to a holding device for securing at least one flat element, in particular a facade element, comprising at least one substructure securing means, at least one flat element securing means and at least one transversal force absorbing means which interconnects the substructure securing means and the flat element securing means and which absorbs forces that are effective in the plane defined by the flat elements, characterized in that the holding device comprises at least one to energy absorbing means which absorbs energy that is introduced into the holding device by forces that act perpendicularly to the plane defined by the flat elements.

18 Claims, 12 Drawing Sheets

(51) Int. Cl.
- *F16B 1/00* (2006.01)
- *G09F 7/18* (2006.01)
- *F16M 13/02* (2006.01)
- *E06B 3/54* (2006.01)

(56) References Cited

U.S. PATENT DOCUMENTS

| | | | |
|---|---|---|---|
| 5,201,484 A * | 4/1993 | Thoen | 248/68.1 |
| 5,501,440 A * | 3/1996 | Blise | 269/253 |
| 6,158,177 A * | 12/2000 | Blobaum | 52/208 |
| 6,254,397 B1 | 7/2001 | Elmer | |
| 6,430,894 B1 * | 8/2002 | Chae et al. | 52/786.1 |
| 6,442,911 B2 * | 9/2002 | Elmer | E06B 3/5436 403/388 |
| 6,463,631 B2 * | 10/2002 | Noda | 24/16 R |
| 6,471,179 B1 * | 10/2002 | Tousi et al. | 248/635 |
| 6,623,203 B2 * | 9/2003 | Kreyenborg et al. | 403/374.3 |
| 6,694,687 B2 * | 2/2004 | Elmer | E06B 3/5436 403/367 |
| 6,986,494 B2 * | 1/2006 | Strasser | 248/500 |
| 7,003,827 B2 * | 2/2006 | DeMayo | 5/600 |
| 7,507,906 B2 * | 3/2009 | Suzuki | 174/68.1 |
| 7,758,502 B2 * | 7/2010 | Phillips et al. | 600/234 |
| 7,845,607 B2 * | 12/2010 | Matthiessen et al. | 248/297.11 |
| 2007/0051933 A1 * | 3/2007 | Rincoe | 254/425 |
| 2008/0157454 A1 * | 7/2008 | Huang | 269/216 |
| 2009/0140481 A1 * | 6/2009 | Livingston et al. | 269/243 |

FOREIGN PATENT DOCUMENTS

| | | |
|---|---|---|
| FR | 2 676 768 A1 | 11/1992 |
| WO | 99/63193 A1 | 12/1999 |
| WO | 01/63082 A1 | 8/2001 |

OTHER PUBLICATIONS

International Search Report as mailed on Jul. 9, 2012 for International Application No. PCT/DE2011/002191.

* cited by examiner

HOLDING DEVICE FOR FLAT ELEMENTS

CROSS-REFERENCE TO RELATED APPLICATIONS

This application represents the national stage entry of PCT International Application No. PCT/DE2011/002191 on Dec. 30, 2011 and claims the benefit of German Patent Application No. 10 2010 056 502.4 filed Dec. 30, 2010. The contents of these applications are hereby incorporated by reference as if set forth in their entirety herein.

The present invention relates to a holding device according to the preamble of claim 1.

Generic holding devices are used, for example, but by no means exclusively, in façade construction for connecting flat elements, in particular panes and plates, to other components of a building, in particular to securing elements of a substructure provided for that purpose, and for thereby forming large façades or façade elements.

In known holding devices for the attachment at a securing substructure on the one hand, and for the attachment of at least one flat element on the other hand, provisions are made in general and in a basically known manner to deflect forces via the holding device, said forces acting parallel to the planes defined by the flat elements at the holding devices, and to transfer said forces into the structure lying underneath or behind, for example into walls of a building. For this purpose, it can be provided in the known manner that the holding device is connected to a substructure which is itself in turn connected to a base structure, such as a wall, mural or ceiling element. The forces which can be deflected to a base structure by means of the known holding devices are, for example, the weight forces of the flat elements, respectively the own weight loads of the flat elements.

When using known holding devices, it can occasionally happen that particularly large flat elements must be secured or held. This can have constructional, but also esthetic reasons. However, with increasing size of the secured flat elements, the forces which act perpendicularly on the plane of the flat elements increase as well. Regarding the example of a holding device in the field of façade construction, the pushing and pulling forces acting on the flat elements due to wind blasts and wind currents, but also due to more extreme forces, for example in case of an explosion, shall be exemplarily mentioned. Such forces can generally, and with increasing size of the flat elements to an extraordinary extent, exceed the load limits of the flat elements and can thus cause damage to the flat elements, which in turn leads to expensive and time-consuming maintenance work.

Starting from said state of the art, it is the object of the present invention to propose a holding device, with which the flat elements secured thereon can be exposed to larger external force impact without incurring the risk of damage to and/or fatigue of the flat elements and/or damage to a substructure and/or a base structure.

This object is attained by a holding device according to the teaching of claim 1.

Advantageous embodiments are the subject matter of the dependent claims.

The holding device according to the invention for the attachment at a securing substructure and for securing at least one flat element comprises at least one substructure securing means by means of which an attachment at a substructure can take place. Further, the holding device according to the invention provides a flat element securing means by means of which the securing of a flat element at the holding device can take place. Further, the holding device according to the invention provides at least one transversal force absorbing means which interconnects the substructure securing means and the flat element securing means and by means of which forces acting parallel to the large surfaces of the flat element are absorbed. In other words, it is the task of the transversal force absorbing means to transfer the forces which act substantially parallel to the plane defined by the flat elements from the to flat element securing means to the substructure securing means, from where they can be deflected to the securing substructure.

According to the basic idea of the invention, the claimed holding device also comprises an energy absorbing means which is adapted for absorbing energy which is introduced into the holding device by forces acting on the at least one flat element perpendicularly to the plane of the flat element. Thereby it is made possible that the forces acting substantially perpendicularly to the plane of the flat elements, respectively the energy associated with said forces, does not lead to fatigue of or damage to the flat elements, the substructure or the base structure, not even in substructures or base structures that are not ordinarily adapted for energy absorption. This, in turn, has the advantage that the respective flat elements have to meet less stringent requirements and accordingly can be produced faster and at lower cost or that, alternatively, highly stressable flat elements can resist even larger or more extreme force impacts without suffering damage or fatigue. Thus, it is also achieved that the flat elements secured by means of the holding devices according to the invention and also the planes formed by several flat elements, such as facades, have an overall increased life span without requiring time-consuming or expensive maintenance and repair work. This is particularly desirable in the light of the fact that when used in façade construction, such holding devices are often utilized at high altitudes or in other places that are hard to reach, which further complicates maintenance and repair.

It is particularly advantageous if the flat element securing means comprise means for securing façade elements, in particular glass panes and/or laminated glass panes. This is desirable since the holding device according to the invention can be utilized particularly advantageously in façade construction, where flat elements are preferably made of such materials. Alternatively or additionally, however, the flat element securing means can also comprise means for securing flat elements made to of metal and/or plastic and/or other composite materials which have a planar, i. e. a substantially flat or pane-type, character.

The flat element securing means is adapted such that it can ensure a secure attachment of at least one flat element of this type at the holding device. Preferably, the securing can take place by creating a clamping effect on a flat element or on parts of a flat element by means of two clamping jaws, wherein the clamping effect can be generated, for example, by a relative motion of the clamping jaws with respect to each other. To that effect, the flat element securing means according to one embodiment comprises two clamping jaws which can be moved relative to each other by means of a clamping mechanism or a clamping device.

However, in principle, the flat element securing means can effect the securing of the at least one flat element at the holding device by means of a plurality of other basically known securing means and by means of a corresponding realization.

In order to make the attachment of the flat elements even more secure, it can be advantageous if it is not an even surface of a clamping jaw that comes to abut on an even surface of a flat element in the clamped state. Accordingly, it is advantageous if the clamping jaws have protrusions or recesses which engage into depressions or recesses of the flat elements or enclose protrusions of the flat elements when a relative motion of the clamping jaws results in the clamped state. In other words, this means that a particularly secure attachment of the flat elements is achieved if the sides of the clamping jaws facing the flat elements have a profile which substantially corresponds to the negative of the profile of the flat elements in the respective securing area.

An advantageous realization of the substructure securing means highly depends on the respective individual design of the substructure. In general, however, it is advantageous in façade construction if, on the one hand, the holding device can be quickly and securely attached at a façade substructure and, on the other hand, it allows a simple adjusting and setting of the exact securing position with respect to the substructure. This can be advantageously achieved by the substructure means having two clamping fittings which can be moved relative to each other by means of a clamping mechanism or respective clamping means. Substructure securing means realized in this manner can enable a secure, easy, quick and precise mounting of the holding device on a plurality of different façade substructures, for example in the form of a rod net, brace net and/or cable net or also on rails, carriers or simple substructure points.

According to another embodiment, it is provided that the transversal force absorbing means is realized as a guide rod and is connected to the substructure securing means in a force-fitting manner. Thus, it is made sure that the transversal forces, for example the weight forces of the flat elements in façade construction, can be deflected without any problems to the substructure or façade substructure and, subsequently, possibly to a base structure. At the same time, due to the realization as a guide rod, a guiding of the flat elements or the flat element securing means can be achieved, which is described in more detail in the following.

Since energy absorption by means of the energy absorbing means according to the holding device according to the invention is accompanied by a motion process within the holding device, it is furthermore provided according to another advantageous embodiment that the flat element securing means is flexibly connected to the transversal force absorbing means, respectively to the guide rod, wherein the connection is realized such that a motion of the flat element securing means can take place substantially vertically to the planes of the flat elements. Thus, in general, a limited flexibility of the flat elements is made possible. Accordingly, the flat elements can yield to forces acting thereon, wherein the energy necessary for the motion can be absorbed by the holding device via the energy absorbing means. In other words, this means that a targeted motion of the flat element securing means relative to the rest of the securing device, respectively along the transversal force absorbing means or the guide rod is made possible, wherein the energy absorbing means is arranged such that the occurring kinetic energy can be absorbed.

As an alternative to the two above-described embodiments of the claimed holding device, it can also be envisaged that a rigid, force-fitting connection between the flat element securing means and the transversal force absorbing means is provided and the transversal force absorbing means is connected to the substructure securing means in such a manner that a corresponding relative motion of the transversal force absorbing means and the substructure securing means becomes possible. The choice if and in which spot the transversal force absorbing means is flexibly connected and if and in which spot it is rigidly connected can be made in each case depending on the respective factors, such as the flat elements or façade elements to be secured, the flat element securing means to be used, the given substructure and the like, and in the respectively advantageous way.

According to another particularly advantageous embodiment of the holding device, it is provided that the energy absorbing means comprises at least one deformation body which can reversibly absorb energy by elastic deformation. Thus it is made possible that the energy absorbing means and thereby the entire holding device can absorb energy during times of large force impact or of peak stress loads and can thus prevent damage to or fatigue of the flat elements, and the absorbed, respectively stored energy can be released to the environment again once the high stress has subsided.

However, there is also the danger that the forces acting on the flat elements perpendicularly to the planes of the flat elements become so strong that a reversible absorption of the associated energy to the extent possible does not appear sensible without risking damage to the flat elements. In other words, this means that with large, in particular short force impacts on the flat elements, it is especially desirable to deflect the associated energy from the respective holding device as quickly and permanently as possible. Accordingly, an advantageous embodiment provides that the energy absorbing means comprises at least one deformation body which can irreversibly absorb energy through plastic deformation. In this way, it is achieved that energy which causes the motion of the flat elements with respect to the holding device is utilized for the deformation of the deformation bodies of the energy absorbing means, whereby the respective forces can be transferred from the flat elements to the holding device and the associated energy can be deflected from the holding device by the deformation of the deformation body of the energy absorbing means.

The two afore-described embodiments of the holding device according to the invention can also be combined with each other in any optional manner. In other words, this means that a single deformation body can be provided, which allows for both an elastic and a plastic deformation, but also multiple individual deformation bodies can be comprised in the energy absorbing means, wherein the respective deformation bodies can be provided for a targeted elastic deformation, a targeted plastic deformation or a combined elastic and plastic deformation. By accordingly choosing the deformation body, respectively the deformation bodies, an energy absorbing means can be provided which makes possible the respectively best protection of the flat elements against the force impacts to be expected, respectively to be feared. Additionally, the occurrence of undesired or damaging resonance effects can be avoided by an appropriate choice of the deformation body, respectively the deformation bodies.

According to an advantageous embodiment, it is further provided that the deformation body is realized as a spring, in particular as a disc spring. Springs of this kind can have particularly good elastic and/or plastic deformation characteristics in accordance with the respective requirements.

According to an alternative embodiment, it can be provided that the deformation body is realized as a hollow metal body which is filled with a metal foam filling. The afore-mentioned deformation bodies have particularly good and desirable characteristics, especially in terms of energy absorption by plastic deformation, for the energy absorbing means according to the invention, respectively for the holding device according to the invention,. The metal foam in the inside of the hollow metal deformation body can for example be formed from aluminum foam. Alternatively, however, different other metallic or also non-metallic fillings or filling structures of a hollow deformation body are conceivable and can be advantageous depending on the respective requirements.

Further, it is desirable that in the state of normal force impact, i.e. in the absence of stress on the energy absorbing means, the holding device has as little play as possible between the individual components. Accordingly, it is particularly advantageous if the energy absorbing means is formed as a hollow cylinder and encloses a cylindrical transversal force absorbing means, wherein the outer radius of the transversal force absorbing means is slightly smaller than the inner radius of the energy absorbing means. Consequently, on the one hand, the energy absorption of the energy absorbing means is not limited by the contact to or the friction on the transversal force absorbing means and on the other hand, a compact, stable and constructively simple realization of the holding device without play between the components is achieved.

In order to be able to absorb pressure forces, i.e. forces acting in the plane of the flat elements in the direction of the substructure, with the holding device in accordance with the invention according to an advantageous modification it is provided to connect at least one energy absorbing means to the flat element securing means on the side of the to flat element connecting means facing the substructure securing means, wherein the energy absorbing means completely encloses the transversal force absorbing means along the transversal force absorbing means starting from the flat element securing means. Thus, when pressure forces act on the flat elements, the flat element securing means can be moved relative to the substructure securing means and the energy necessary for this, respectively the energy being generated during this, can be absorbed by the energy absorbing means.

In order to avoid uncontrolled motions of the flat elements, respectively the flat element securing means, it can further be provided that the energy absorbing means ends flush with the substructure securing means and the flat element securing means.

Air motions, respectively air currents, as well as reactions to pressure forces, such as backlash, can result in enormous pulling forces, i.e. forces which act perpendicularly on the planes of the flat elements, away from the substructure, acting on the flat elements. In order to ensure a temporary or permanent energy absorption by the holding device or by respective energy absorbing means of the holding device even with force impacts of this kind, it is provided according to a further particularly advantageous realization of the holding device in accordance with the invention that at least one energy absorbing means is adjacent to the flat element securing means on the side of the flat element securing means facing away from the substructure securing means, wherein the energy absorbing means completely surrounds the transversal force absorbing means along the transversal force absorbing means starting from the flat element securing means. For securing the energy absorbing means, corresponding devices, such as stops or recesses, can be provided, for example, on the end of the transversal force absorbing means facing away from the substructure securing means. In other words, this means that, in the case of a flexible mounting of the flat element securing means, the transversal force absorbing means extends beyond the flat element securing means on the side facing away from the substructure securing means and an energy absorbing means is arranged on the side of the flat element securing means facing away from the substructure securing means. In analogy to the afore-described alternative of a relative motion of the substructure securing means relative to the transversal force absorbing means, an energy absorbing means for the energy absorption of energy caused by a pulling force can be provided also on the side of the substructure securing means facing away from the flat element securing means, wherein then also a corresponding extension of the transversal force absorbing means beyond the substructure securing means is to be provided.

For absorbing the afore-described pulling forces and their respective energies, it can also be particularly advantageously provided that the energy absorbing means ends flush with the flat element securing means and with the end of the transversal force absorbing means facing away from the substructure securing means. A corresponding flush mount can also be provided for the afore-described alternative of a substructure securing means that is flexible with respect to the transversal force absorbing means. Here, too, the flush mount prevents undesired motions of the flat elements, respectively of the flat element securing means, and allows for a compact, low-wear realization of the holding device.

To reduce the number of required holding devices without reducing functionality, a further advantageous embodiment provides that a plurality of flat element securing means is connected to a flat element securing means distributing element, the flat element securing means distributing element being flexibly connected to the transversal force absorbing means. When using one transversal force absorbing means for a plurality of flat element securing means and a corresponding distributing element, it can be provided that with regard to the one or more energy absorbing elements, the distributing element takes the place to of the flat element securing means. In other words, the previously illustrated particularly advantageous embodiments regarding the arrangement of energy absorbing means are also meant to be applicable to an above-described distributing element flexibly connected to a transversal force absorbing means.

Alternatively, it can also be provided that each flat element securing means is connected to one transversal force absorbing means, respectively. However, this does not have the result that a holding device according to the invention can have only one flat element securing means. Rather, it is possible with an alternative distributing element associated with the substructure securing means to provide a plurality of flat element securing means and an equal number of transversal force absorbing means for a single holding device.

Further, it can be desirable that information or, generally speaking, electric (data) streams can be transferred from the substructure, respectively from the base structure, to the outside, i.e. to the end of the transversal force absorbing means facing away from the substructure securing means or vice-versa. To that effect, according to an advantageous embodiment of the holding device, it can be provided that between the substructure securing means and a side of the transversal force absorbing means facing away from the substructure securing means, a continuous duct runs which is adapted for holding an electric line.

For design reasons as well as for technical reasons it can be particularly desirable to send optical signals from the holding device according to the invention to the surroundings facing away from the substructure, respectively from the base structure. To that effect, a particularly advantageous variation of the holding device according to the invention provides that on the side of the transversal force absorbing means facing away from the substructure securing means an illuminant, in particular a light emitting diode, is arranged. In that case, it is particularly advantageous if the control and supply of the illuminant also takes place via the holding device.

In the following, the holding device according to the invention is explained in more detail with the help of drawings merely showing exemplary embodiments.

Figure 1:
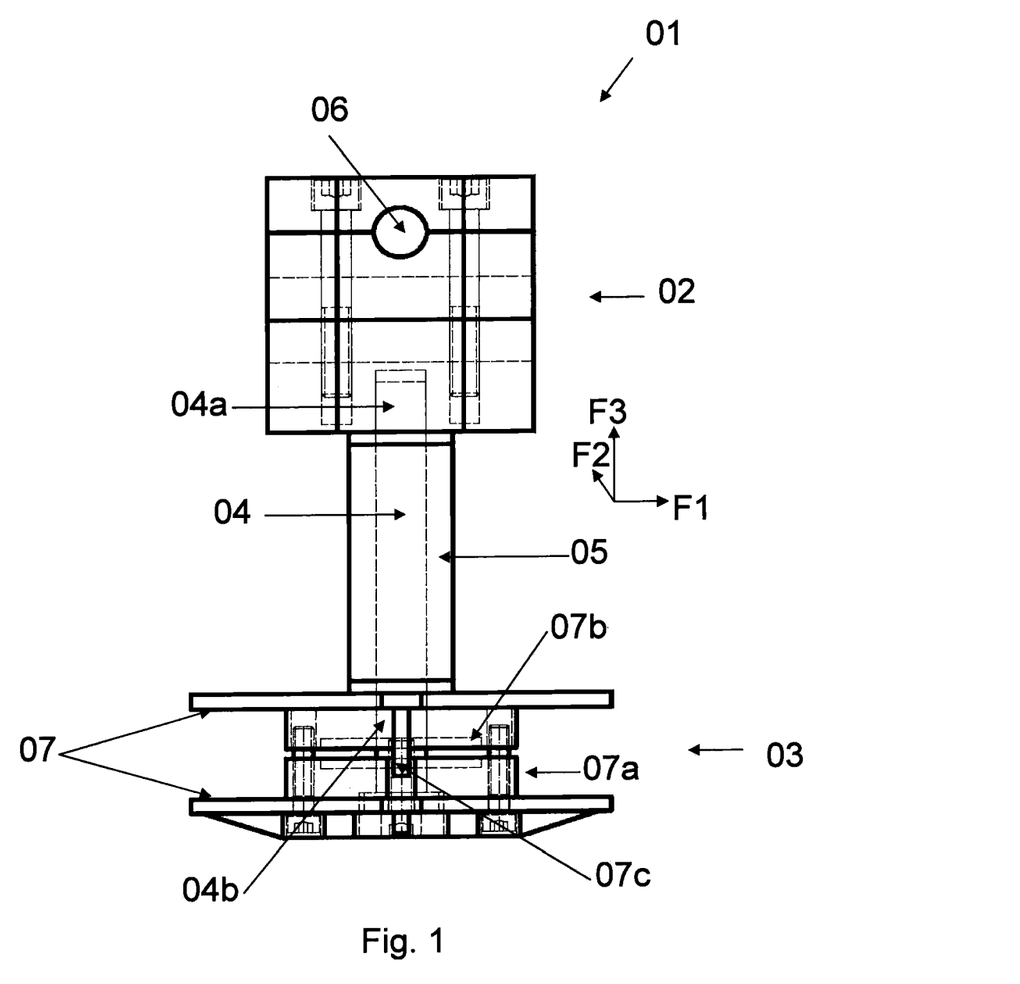
FIG. 1 shows a holding device in accordance with the invention according to a first embodiment.

In FIG. 1, a first embodiment of a holding device 01 according to the invention is illustrated. The holding device 01 comprises a substructure securing means 02, a flat element securing means 03, a transversal force absorbing means 04 and an energy absorbing means 05.

According to this first embodiment, the substructure securing means 02 is adapted for being secured at a rod or cable net substructure, which is indicated by the substructure mounting opening 06. Further, the flat element securing means 03 comprises two securing jaws 07 which, by means of a relative motion towards each other, can produce a clamping effect on a flat element. Also visible are protrusions 07a and recesses 07b of the clamping jaws as well as a guiding device 07c of the clamping jaws 07. The protrusions 07a and recesses 07b, respectively the profile, serve for the secure attachment of the flat elements or façade elements. The guiding device 07c serves for guiding the clamping jaws 07 during a relative motion.

Further, it can be taken from FIG. 1 that the transversal force absorbing means 04 is connected to the substructure securing means 02 in area 04a as well as to the flat element securing means 03 in area 04b. Also, it is visible in FIG. 1 that the energy absorbing means 05 is arranged flush between the substructure securing means 02 and the flat element securing means 03, wherein the energy absorbing means 05 in the embodiment of FIG. 1 forms a hollow cylinder which completely surrounds the transversal force absorbing means 04 which is also cylindrical.

With the holding device 01 according to FIG. 1 it is thus made sure that, firstly, transversal forces F1 and F2, which act on the flat element securing means 03, can be deflected via the transversal force absorbing means 04 and the substructure securing means 02 into the substructure and, secondly, energy can be reversibly or irreversibly absorbed by the energy absorbing means 05 by a motion of the flat element securing means 03 relative to the transversal force absorbing means 04 in the direction of the substructure securing means 02, the motion being caused by forces F3.

Figure 2:
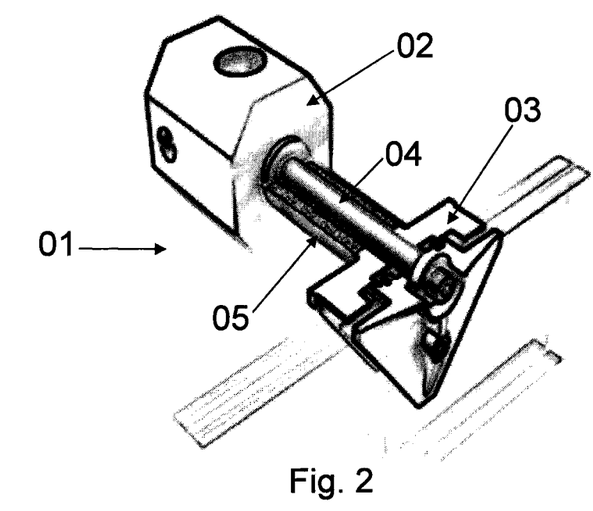
FIG. 2 shows a perspective illustration of a holding device in accordance with the invention according to the first embodiment prior to dissipative energy absorption.
Figure 3:
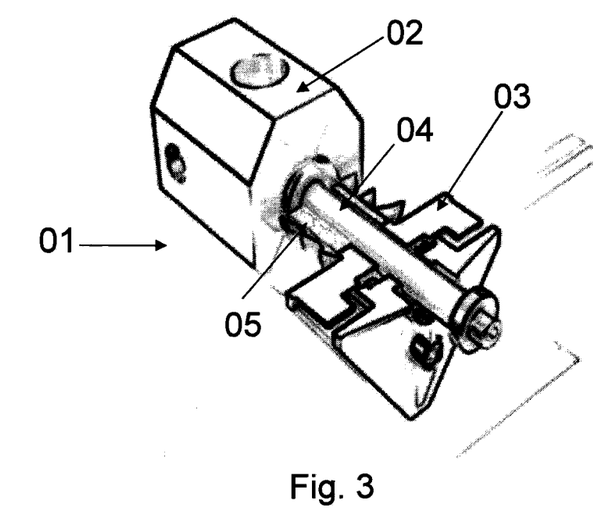
FIG. 3 shows a perspective illustration of a holding device in accordance with the invention according to the first embodiment after dissipative energy absorption.

In FIGS. 2 and 3, the functionality of the holding device according to the invention is schematically illustrated. The holding device 01 corresponds to the first embodiment and comprises, apart from the substructure securing means 02, a transversal force absorbing means 04, a flat element securing means 03 and an energy absorbing means 05. Now it shall be assumed that the two FIGS. 2 and 3 depict the holding device before, respectively after the point in time at which an enormous force acts, respectively has acted on the flat elements in the direction of the substructure securing means. As can be taken from FIG. 3, contrary to FIG. 2, the transversal force absorbing means 04 extends beyond the flat element securing means 03 on the side of the flat element securing means 03 facing away from the substructure securing means 02. In other words, this means that the flat element securing means 03 has been moved along the transversal force absorbing means 04 toward the substructure securing means 02. To deflect the thereby generated energy from the holding device, a plastic deformation of the energy absorbing means 05 has taken place, which is illustrated in FIG. 3 by the shortened length between the substructure securing means 02 and the flat element securing means 03, and by the surface of the energy absorbing means 05 being deformed in a wave-like manner.

In the exploded drawing of the first embodiment, FIG. 4 again shows the individual components of the holding device 01 in accordance with the invention according to FIG. 1. There, it is visible that the substructure securing means 02 comprises two clamping fittings 02a and 02b and a third component 02c as well as the clamping means 02d. By means of the clamping fittings 02a and 02b, the securing at the substructure is realized by means of a clamping effect using the clamping means 02d and, with the component 02c, the securing is realized by means of the transversal force absorbing means according to a respective force-fitting connection.

Figure 4:
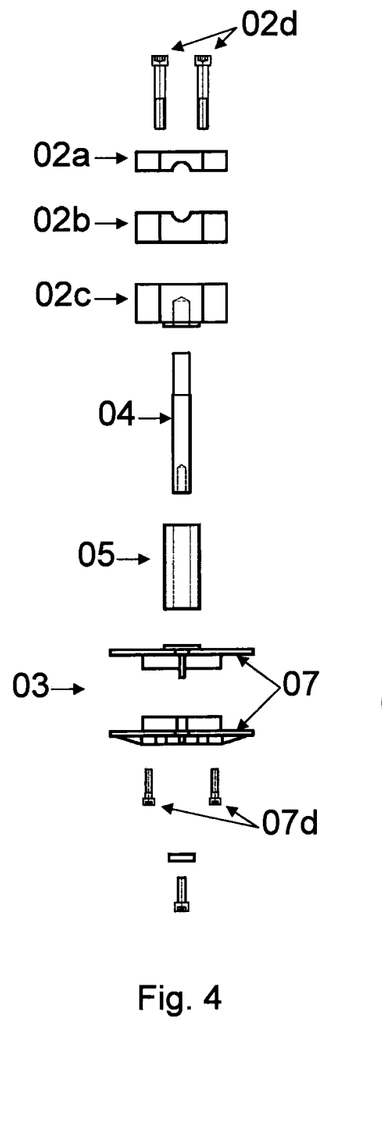
FIG. 4 shows an exploded drawing of the holding device according to a first embodiment.

The clamping devices 07d, including a guiding device 07c of the clamping jaws 07 of the flat element securing means 03, are also visible from the exploded drawing of FIG. 4. As already mentioned, a relative motion of the clamping jaws 07 can be achieved by actuating the clamping devices 07d, the motion being guided by the guiding device 07c. It is also visible that the cylindrical energy absorbing means 05 has a recess extending along the longitudinal axis so that the energy absorbing means 05 can extend concentrically around the transversal force absorbing means 04 which is also cylindrical.

Figure 5:
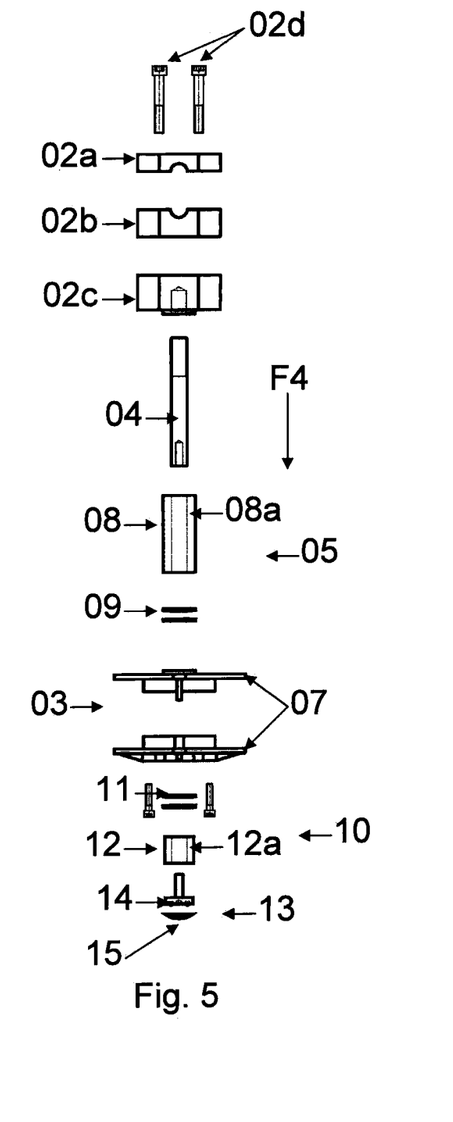
FIG. 5 shows an exploded drawing of a holding device in accordance with the invention according to a second embodiment.

FIG. 5 shows an exploded drawing of a holding device 01 in accordance with the invention according to a second embodiment. The second embodiment firstly differs from the first embodiment of FIGS. 1 to 4 in that the first energy absorbing means 05 comprises two deformation bodies 08 and 09, the first deformation body 08 being a deformation body for plastic deformation, for example a hollow metal body with a metal foam filling 08a, and the deformation body 09 being a deformation body for elastic deformation. The deformation body 09 is realized, for example, as a disc spring. Further, in addition to the first embodiment of FIGS. 1 to 4, the second embodiment provides for a second energy absorbing element 10, which is disposed on the side of the flat element securing means facing away from the substructure securing means, respectively is adjacent to the flat element securing means, and is thus adapted for absorbing energy which is generated by pulling forces, i.e. forces F4 which are effective from the substructure securing means 02 in the direction of the flat element securing means 03. The energy absorbing means 10 is again formed by a plastic deformation body 12 as well as by an elastic deformation body 11. Also in addition to the first embodiment, the holding device 01 according to the second embodiment in FIG. 5 is provided with an illuminant 13, which is disposed on the end 04c of the transversal force absorbing means 04 facing away from the substructure securing means. The lighting device 13 comprises a plurality of illuminants 14, for example light emitting diodes, as well as an optical element 15, for example a lens.

Figure 6:
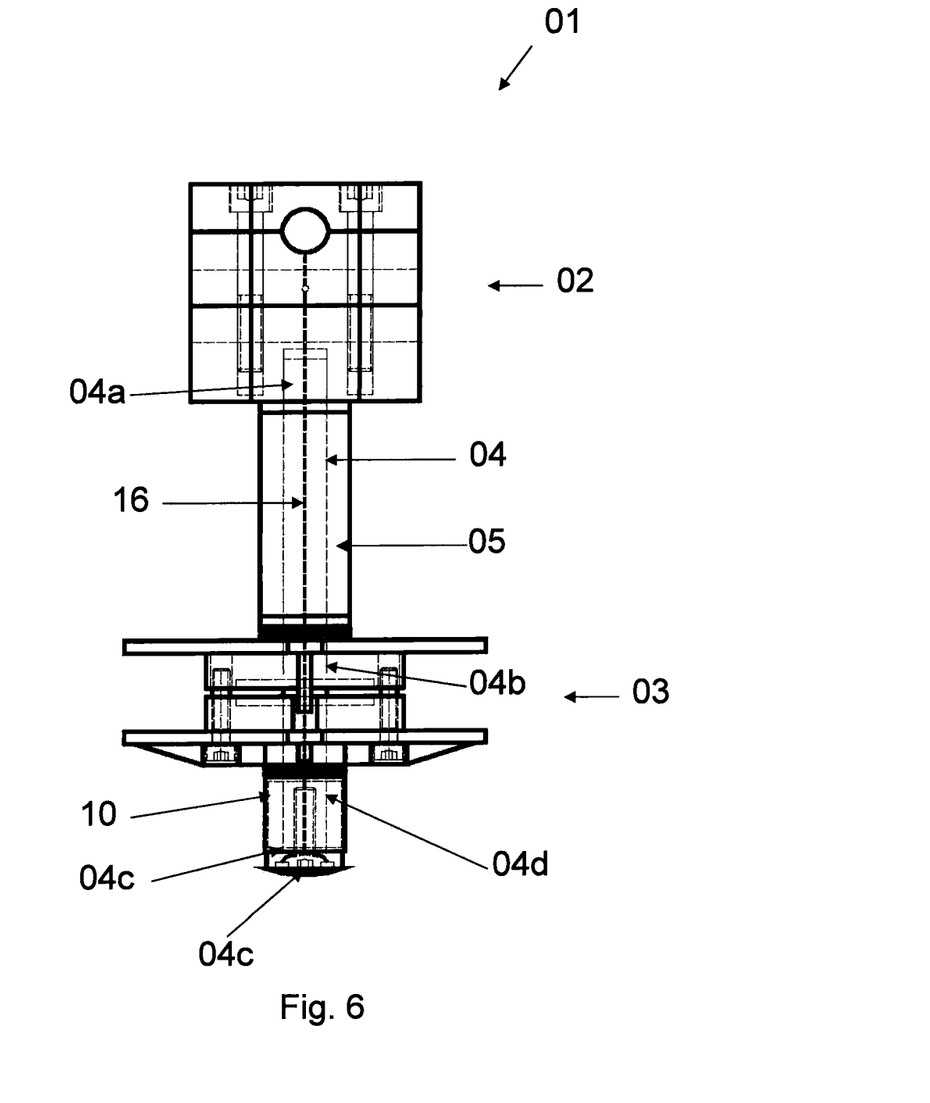
FIG. 6 shows a holding device in accordance with the invention according to a third embodiment.

FIG. 6 shows a third embodiment of the holding device 01 according to the invention, wherein, in addition to the second embodiment of FIG. 5, the holding device 01 comprises a duct 16 indicated by a dotted line, which extends from the substructure securing means 02 to an end 04c of the transversal force absorbing means 04 facing away from the substructure securing means. Thereby, the electric control and energy supply of the lighting device 13 can be realized, for example.

In the illustration of FIG. 6, in particular compared to FIG. 5, it is clearly visible that the transversal force absorbing means 04 extends from the substructure securing means 02 across the flat element securing means 03 and, in area 04d, even across the side of the flat element securing means facing away from the substructure securing means. This makes clear that the flat element securing means 03 is mounted substantially flexibly on the transversal force absorbing means 04 and the motion is only limited by the energy absorbing means 05 and 10, which each abut flush.

Figure 7:
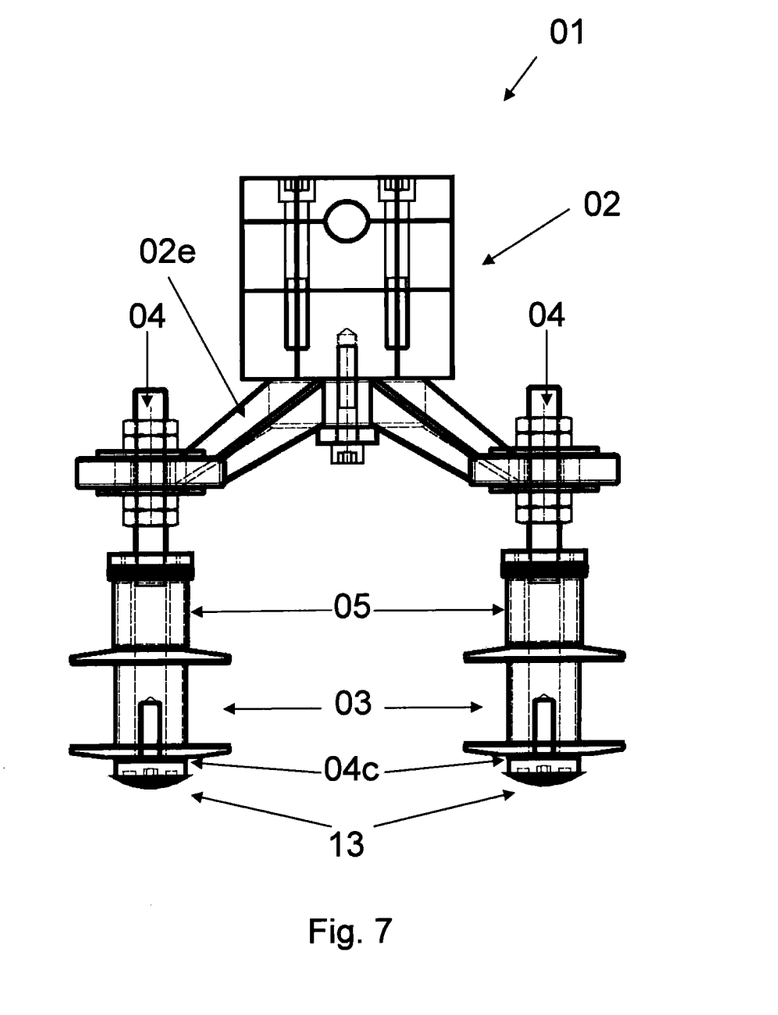
FIG. 7 shows a holding device in accordance with the invention according to a fourth embodiment.

FIG. 7 shows a holding device 01 in accordance with the invention according to a fourth embodiment. Here, the holding device 01 comprises two transversal force absorbing means 04, which each are in turn connected to a flat element securing means 03 and each are surrounded at least partially by an energy absorbing means 05. The securing of two transversal force absorbing means 04 at the substructure securing means 02 takes place by means of a distributing element 02e which can be associated with the substructure securing means 02. Also, it can be taken from FIG. 7 that on each of the two transversal force absorbing means 04, a lighting device 13 is arranged on one end thereof. Additionally, it is also possible that the distributing element 02e is a distributing element with three, four or multiple arms, to which a corresponding number of transversal force absorbing means 04 and a corresponding number of flat element securing means and energy absorbing means can be connected.

Figure 8:
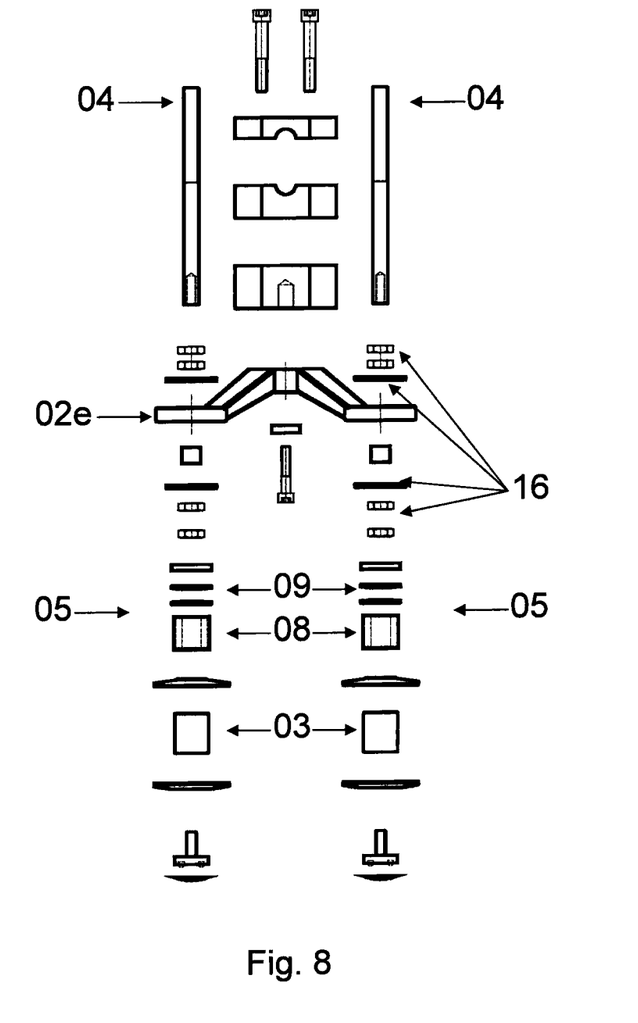
FIG. 8 shows an exploded drawing of the holding device according to the fourth embodiment.

FIG. 8 shows an exploded drawing of the holding device 01 according to the fourth embodiment of FIG. 7. Here, one can clearly recognize the fastening means 16 by means of which the securing of the two transversal force absorbing means 04 to the distributing element 02e of the substructure securing means 02 takes place. The respective two deformation bodies 08 and 09 of the energy absorbing elements 05 are illustrated as well.

Figure 9:
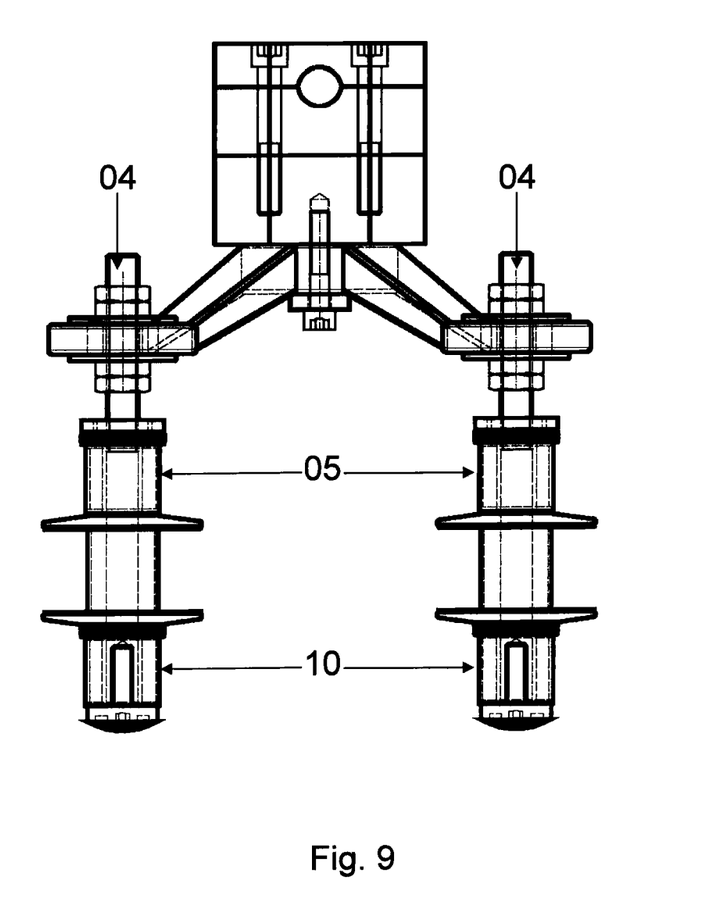
FIG. 9 shows a holding device in accordance with the invention according to a fifth embodiment.

FIG. 9 shows a fifth embodiment of the holding device 01 according to the invention, wherein in a further development of the fourth embodiment of FIGS. 7 and 8, now each of the transversal force absorbing means 04 is surrounded by two energy absorbing means 05 and 10, respectively, wherein one energy absorbing means is adjacent to one side of the flat element securing means in each case. Thus, the holding device 01 can reversibly or irreversibly absorb energy from pulling forces in the direction F4 as well as energy from pressure forces in the direction F3, wherein the absorption takes place by a motion along a transversal force absorbing means 04 associated with one flat element securing means in each case.

Figure 10:
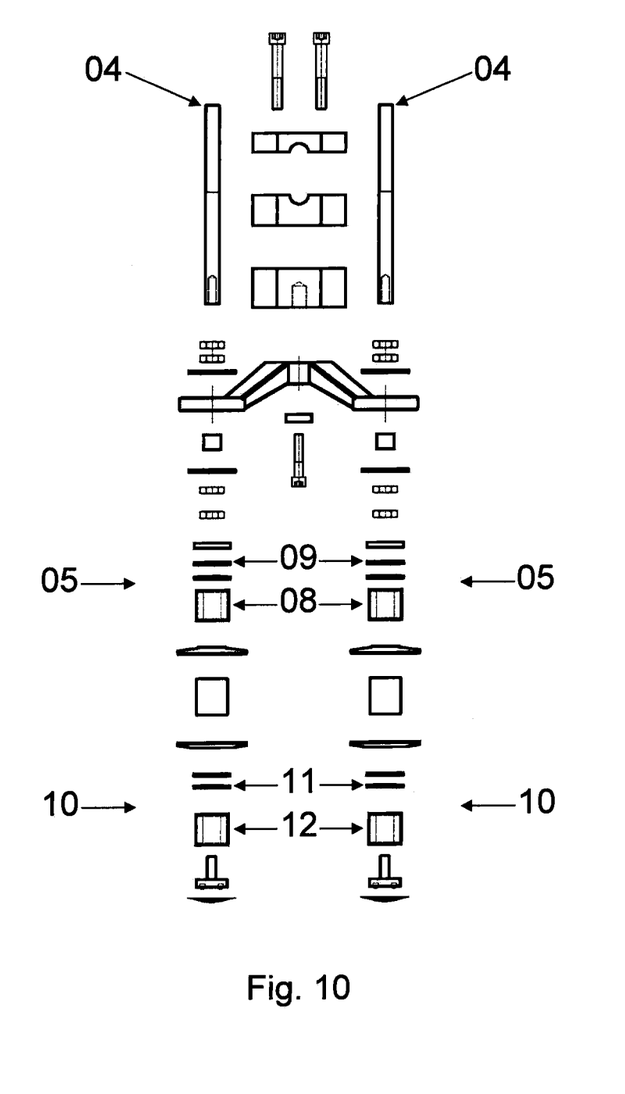
FIG. 10 shows an exploded drawing of a holding device according to the fifth embodiment.

FIG. 10, which shows an exploded drawing of the holding device 01 according to the fifth embodiment of FIG. 9, also clearly shows that the respectively two energy absorbing means 05 and 10 of the two transversal force absorbing means 04 are also realized by two deformation bodies 08 and 09 as well as 11 and 12, respectively. This embodiment, too, can be a distributing element 02e with multiple arms and a corresponding number of transversal force absorbing means 04.

Figure 11:
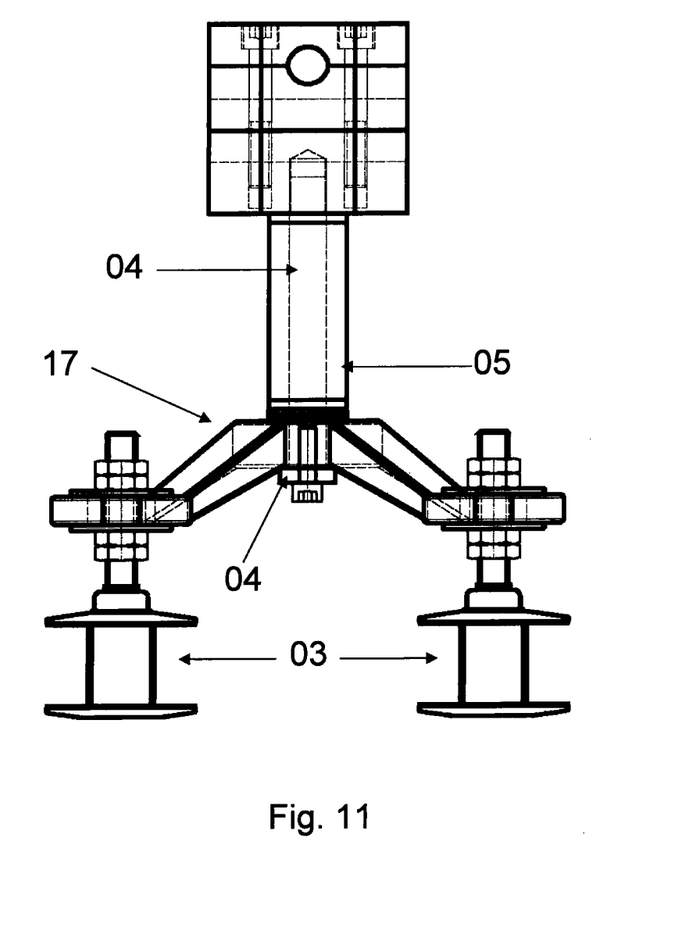
FIG. 11 shows a holding device according to a sixth embodiment.

FIG. 11 shows a holding device 01 in accordance with the invention according to a sixth embodiment, wherein the holding device 01 comprises only one transversal force absorbing means 04 and a plurality of flat element securing means 03. This is achieved in that the flat element securing means 03 are connected to the transversal force absorbing means 04 only indirectly via a flat element securing means distributing element 17. According to the sixth embodiment of FIG. 11, in this case, the distributing element 17 is mounted flexibly on or at the transversal force absorbing means 04 so that energy, which is introduced into the holding device by pressure forces, can be absorbed or deflected by means of the energy absorbing means 05. Thus, energy absorption due to pressure force impact on a plurality of flat element securing means 03 in total is possible via merely one transversal force absorbing means 04 and one energy absorption means 05.

Figure 12:
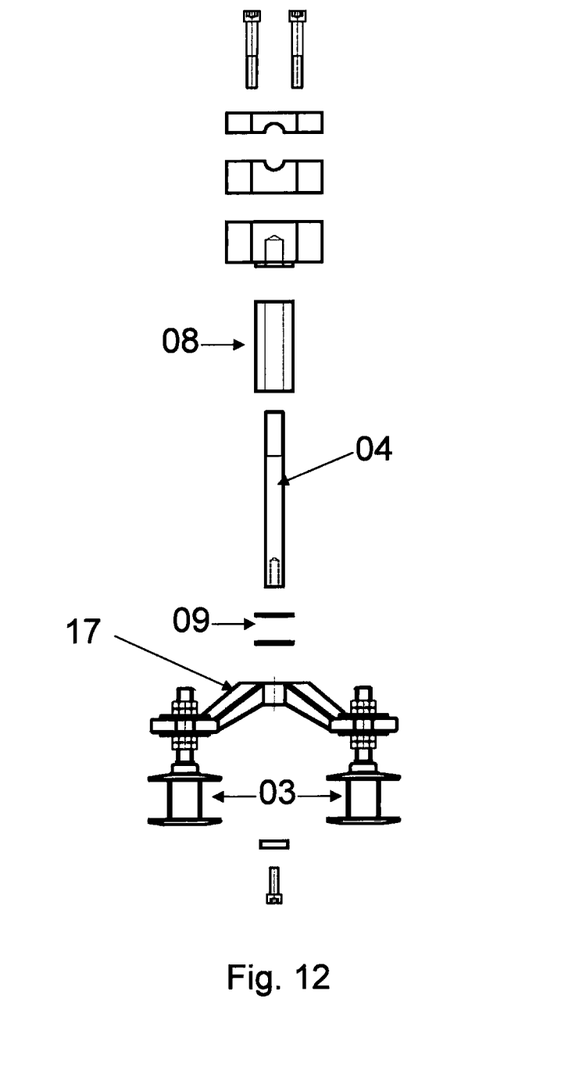
FIG. 12 shows an exploded drawing of a holding device according to the sixth embodiment.

FIG. 12 shows an exploded drawing of a holding device 01 in accordance with the invention according to the sixth embodiment, from which it becomes clear once again that two flat element securing means 03 are connected to a common flat element securing means distributing element 17 and wherein the flat element securing means distributing element 17 is flexibly secured, respectively mounted, on the transversal force absorbing means 04.

Figure 13:
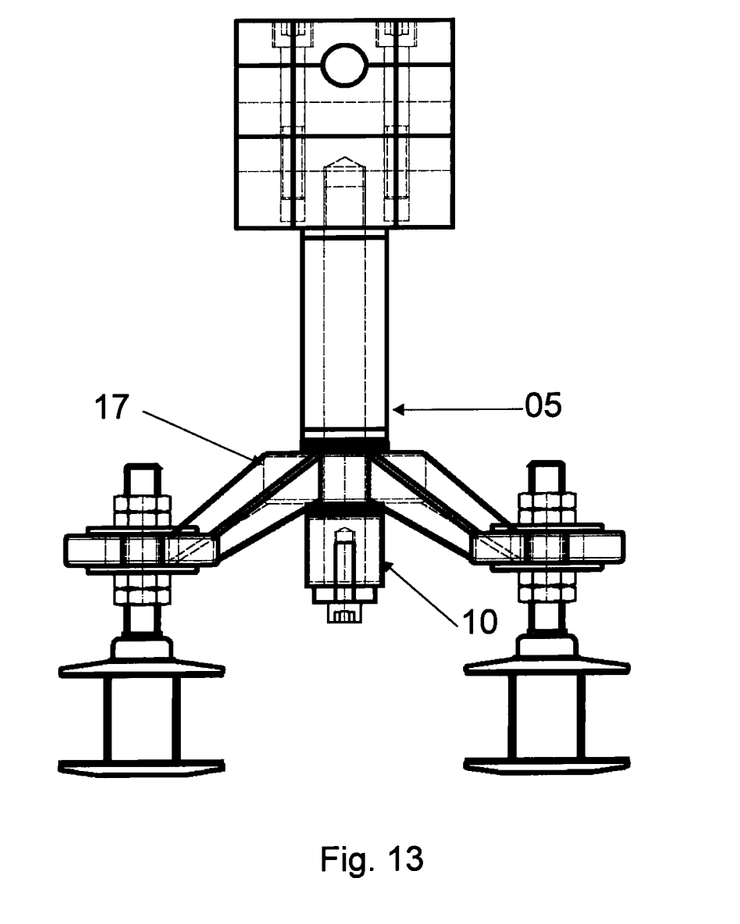
FIG. 13 shows a holding device according to a seventh embodiment.

FIG. 13 shows a seventh embodiment of a holding device 01 according to the invention, wherein this is a further development of the sixth embodiment. The embodiment illustrated in FIG. 12 differs from the afore-described embodiment in that, again, two energy absorbing means 05 and 10 are comprised by the holding device, wherein these energy absorbing means abut against both sides of the flat element securing means distributing element 17 and, thus, are adapted for absorbing energy due to pressure forces as well as for absorbing energy due to pulling forces.

Figure 14:
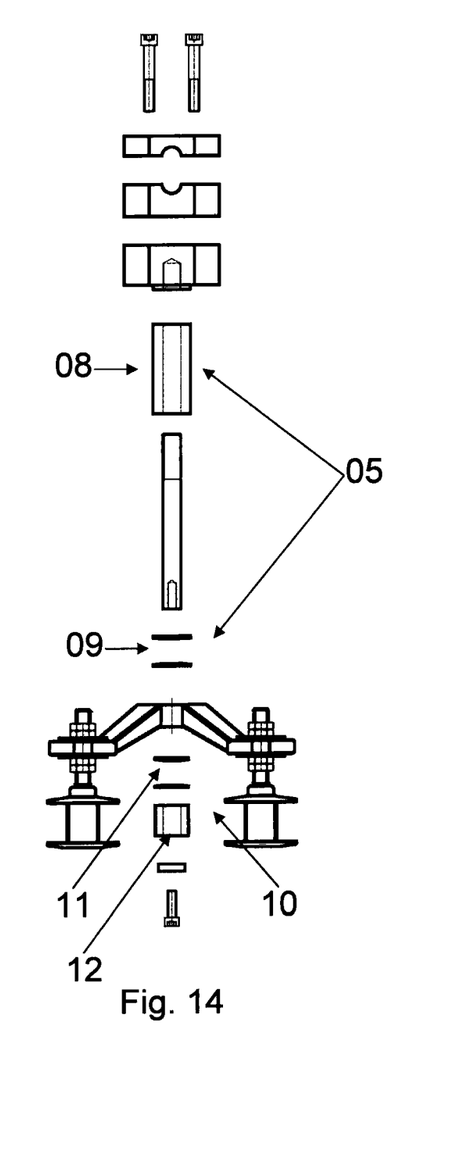
FIG. 14 shows an exploded drawing of a holding device according to the seventh embodiment.

FIG. 14 shows an exploded drawing of the holding device 01 in accordance with the invention according to the seventh embodiment, wherein it can also be taken from FIG. 12 that the two energy absorbing means 05 and 10 each comprise two deformation bodies 08 and 09, respectively 11 and 12.

The invention claimed is:

1. A holding device for securing at least one flat element, said holding device comprising:
   at least one substructure securing device;
   at least one flat element securing device;
   at least one transversal force absorbing device having a first end and a second end, said first end being rigidly fixed to the substructure securing device, and the flat element securing device being slidably mounted on said second end, said at least one transversal force absorbing device absorbing forces that are effective in a plane defined by a flat element secured by the holding device, wherein the at least one transversal force absorbing device is a guide rod connected to the at least one substructure securing device in a force-fitting manner; and
   at least one energy absorbing device biasing said at least one flat element securing device away from said at least one substructure securing device and absorbing energy introduced into the holding device by forces that act perpendicularly to the plane defined by the flat element.

2. The holding device according to claim 1, in which the flat element securing device secures laminated glass panes and/or glass panes.

3. The holding device according to claim 1, in which the flat element securing device comprises clamping jaws which can be moved relative to each other by a clamping device, whereby a clamping effect on a flat element is caused.

4. The holding device according to claim 3, in which the clamping jaws have protrusions or recesses which can engage into depressions or recesses of the flat elements or enclose protrusions of the flat elements when the clamping jaws are moved relative to each other.

5. The holding device according to claim 1, in which the substructure securing device composes clamping fittings for attachment at a facade substructure, wherein the clamping fittings can be moved relative to each other by a clamping device.

6. The holding device according to claim 1, in which the flat element securing device is flexibly connected to the transversal force absorbing device, the connection being realized in such a manner that a motion of the flat element securing device can take place transversely to the plane defined by the flat element.

7. The holding device according to claim 1, in which the energy absorbing device comprises at least one deformation body, which can reversibly and/or irreversibly absorb energy by elastic and/or plastic deformation.

8. The holding device according to claim 7, in which the deformation body is a spring.

9. The holding device according to claim 7, in which the deformation body is a hollow metal body which is filled with a metal foam filling.

10. A holding device according to claim 1, in which on a said of the flat element securing device facing the substructure securing device, the at least one energy absorbing device is adjacent to the flat element securing device, the at least one energy absorbing device completely surrounding the transversal force absorbing device starting from the flat element securing device.

11. The holding device according to claim 1, in which on a side of the flat element securing device facing away from the substructure securing device, at least one other energy absorbing device is adjacent to the flat element securing device, wherein the at least one other energy absorbing device completely surrounds the transversal force absorbing device starting from the flat element securing device.

12. The holding device according to claim 11, in which the at least one other energy absorbing device extends between the first and second ends of the at least one transversal force absorbing device facing away from the substructure securing device.

13. The holding device according to claim 1, in which a plurality of flat element securing devices are connected to a flat element securing device distributing element, said flat element securing device distributing element being flexibly connected to the transversal force absorbing device.

14. The holding device according to claim 1, in which a plurality of flat element securing devices are connected to one transversal force absorbing device in each case, the transversal force absorbing device being connected to a distributing element associated with the substructure securing device.

15. The holding device according to claim 1, in which a continuous duct runs between the substructure securing device and an end of the transversal force absorbing device facing away from the substructure securing device, said duct being adapted to hold an electric line.

16. The holding device according to claim 1, in which on an end of the transversal force absorbing device facing away from the substructure securing device, a lighting device includes at least one illuminant.

17. A holding device for securing at least one flat element, said holding device comprising:
at least one substructure securing device;
at least one flat element securing device;
at least one transversal force absorbing device having a first end and a second end, said first end being rigidly fixed to the substructure securing device, and the flat element securing device being slidably mounted on said second end, said at least one transversal force absorbing device absorbing forces that are effective in a plane defined by a flat element secured by the holding device; and
at least one energy absorbing device biasing said at least one flat element securing device away from said at least one substructure securing device and absorbing energy introduced into the holding device by forces that act perpendicularly to the plane defined by the flat element, said at least one energy absorbing device being formed as a hollow cylinder and surrounding said at least one transversal force absorbing device, said at least one transversal force absorbing device being in the form of a cylindrical transversal force absorbing device, wherein an outer radius of the cylindrical transversal force absorbing device is marginally smaller than an inner radius of the energy absorbing device.

18. A holding device for securing at least one flat element, said holding device comprising:
at least one substructure securing device;
at least one flat element securing device;
at least one transversal force absorbing device having a first end and a second end, said first end being rigidly fixed to the substructure securing device, and the flat element securing device being slidably mounted on said second end, said at least one transversal force absorbing device absorbing forces that are effective in a plane defined by a flat element secured by the holding device; and
at least one energy absorbing device biasing said at least one flat element securing device away from said at least one substructure securing device and absorbing energy introduced into the holding device by forces that act perpendicularly to the plane defined by the flat element, wherein said at least one energy absorbing device extends between the first and second ends of the at least one transversal force absorbing device.

* * * * *